US012769339B2

(12) United States Patent
Falzone et al.

(10) Patent No.: US 12,769,339 B2
(45) Date of Patent: Oct. 20, 2026

(54) COMMAND MONITOR BACKUP CONTROL ARCHITECTURE

(71) Applicant: Wisk Aero LLC, Mountain View, CA (US)

(72) Inventors: Shawn Falzone, Buffalo, NY (US); Arthur Beutler, Oceanside, CA (US)

(73) Assignee: Wisk Aero LLC, Mountain View, CA (US)

( * ) Notice: Subject to any disclaimer, the term of this patent is extended or adjusted under 35 U.S.C. 154(b) by 29 days.

(21) Appl. No.: 18/931,869

(22) Filed: Oct. 30, 2024

(65) Prior Publication Data

US 2025/0138559 A1 May 1, 2025

Related U.S. Application Data

(60) Provisional application No. 63/594,387, filed on Oct. 30, 2023.

(51) Int. Cl.

*G05D 1/87* (2024.01)
*G05D 1/86* (2024.01)
*G05D 101/00* (2024.01)
*G05D 109/20* (2024.01)

(52) U.S. Cl.

CPC ................. *G05D 1/87* (2024.01); *G05D 1/86* (2024.01); *G05D 2101/24* (2024.01); *G05D 2109/20* (2024.01)

(58) Field of Classification Search

CPC ..... B64C 19/00; B64C 13/503; B64C 13/505; G05D 1/0077; H04L 12/40182

See application file for complete search history.

(56) References Cited

U.S. PATENT DOCUMENTS 4,807,516 A * 2/1989 Takats .................. G05D 1/0077 91/509
5,515,282 A 5/1996 Jackson
(Continued)

OTHER PUBLICATIONS

PCT/US2024/053630 , "International Search Report and Written Opinion", Dec. 30, 2024, 15 pages.

*Primary Examiner* — Erin M Piateski
*Assistant Examiner* — John C Merino
(74) *Attorney, Agent, or Firm* — Kilpatrick Townsend & Stockton LLP

(57) ABSTRACT

System, methods, and machine-readable media may facilitate control of an aircraft. An actuator may be controlled based on the following. A first control signal may be output, with a first command module, to control the actuator. The first command module may include a first electronic configuration. Commands generated by the first command module and/or system response signals may be monitored with a monitor module. The monitor module may include a third electronic configuration that is different from the first electronic configuration. A second control signal may be output, with a second command module, to control the actuator when the first command module is deactivated or malfunctioning. The second command module may include a second electronic configuration that is different from the first electronic configuration and the third electronic configuration. The actuator may be controlled using the second control signal when the first command module is deactivated or malfunctioning.

16 Claims, 6 Drawing Sheets

(56) References Cited

U.S. PATENT DOCUMENTS

| | | | | |
|---|---|---|---|---|
| 5,550,736 | A * | 8/1996 | Hay | G06F 11/184 714/E11.061 |
| 7,017,861 | B1 | 3/2006 | Johansson et al. | |
| 2010/0318245 | A1 | 12/2010 | Nakagawa et al. | |
| 2013/0124019 | A1 | 5/2013 | Fukui et al. | |
| 2014/0303812 | A1* | 10/2014 | Avritch | B64C 13/505 701/3 |
| 2014/0324254 | A1 | 10/2014 | Lin et al. | |
| 2015/0274293 | A1 | 10/2015 | Heusinger et al. | |
| 2020/0081786 | A1 | 3/2020 | Galvão et al. | |
| 2020/0164965 | A1 | 5/2020 | Fervel | |
| 2021/0171187 | A1* | 6/2021 | Keir | B64C 19/00 |
| 2022/0234734 | A1 | 7/2022 | Lai | |
| 2023/0322366 | A1* | 10/2023 | De Castro Paiva | G05D 1/102 701/3 |

* cited by examiner

COMMAND MONITOR BACKUP CONTROL ARCHITECTURE

CROSS-REFERENCES TO RELATED APPLICATIONS

This application claims benefit under 35 USC § 119(e) to U.S. Provisional Patent Application No. 63/594,387 filed Oct. 30, 2023, and entitled "COMMAND MONITOR BACKUP CONTROL ARCHITECTURE," the disclosure of which is incorporated by reference herein in its entirety for all purposes.

TECHNICAL FIELD

This disclosure generally relates to aircraft actuation control electronics and propulsion engine control and particularly to command monitor backup control architecture.

BACKGROUND

Controllers of aircraft actuation and/or propulsion engine units may require the mitigation of common mode failures arising from design and/or manufacturing errors within complex electronic hardware devices. Due to aircraft configurations being relatively intolerant to loss of actuation and propulsion functionalities, each controller may need to fail operationally in the case of a common mode failure. In conventional systems, controllers may be used in command/monitor module pairs. When the output of the command module cannot be confirmed by the monitor module, the controller is deactivated.

In conventional aircraft, when a significant portion of controllers are deactivated, the aircraft can continue to operate with significantly reduced resources, and alternate control paths provide ultimately analog signals into hydro-mechanical power control units which generate control power by modulating hydraulic fluid flows in response to those analog inputs. The electrical components of these power control units are not at all complex. However, for all electric aircraft, generation propulsive and control power is directly controlled by localized electronic controllers embodying complex electronic components. Moreover, for non-conventional aircraft requiring high system availability, in the case of a common mode failure, multiple controllers may be deactivated simultaneously, which may have catastrophic results.

Thus, there is need for solutions that address the challenges and problems encumbering aircraft actuation and/or propulsion engine units. This and other needs are addressed by embodiments according to the present disclosure.

BRIEF SUMMARY

Certain embodiments according to the present disclosure relate generally aircraft actuation control electronics and propulsion engine control and particularly to command monitor backup control architecture.

In one aspect, a system may facilitate control of an aircraft. The system may include one or a combination of the following. A controller may be in communication with an actuator. The controller may include a first command module, a second command module, and a monitor module. The first command module may include a first electronic configuration. The first command module may be configured to output a first control signal to control the actuator. The second command module may include a second electronic configuration that is different from the first electronic configuration. The second command module may be configured to output a second control signal to control the actuator. The monitor module may be configured to monitor at least one of (i) one or more commands generated by the first command module, or (ii) one or more system response signals that are based at least in part on one or more sensors. The monitor module may include a third electronic configuration that is different from the first electronic configuration and the second electronic configuration. The actuator may be controlled using the second control signal when the first command module is deactivated or malfunctioning.

In another aspect, one or more non-transitory, machine-readable media having machine-readable instructions thereon which, when executed by one or more processing devices, may cause a system to perform one or a combination of the following operations. An actuator that is communication with the one or more processing devices may be controlled based at least in part on one or a combination of the following. A first control signal may be output, with a first command module, to control the actuator. The first command module may include a first electronic configuration. A second control signal may be output, with a second command module, to control the actuator when the first command module is deactivated or malfunctioning. The second command module may include a second electronic configuration that is different from the first electronic configuration. One or more commands generated by the first command module and/or one or more system response signals that are based at least in part on one or more sensors may be monitored with a monitor module. The monitor module may include a third electronic configuration that is different from the first electronic configuration and the second electronic configuration. The actuator may be controlled using the second control signal when the first command module is deactivated or malfunctioning.

In yet another aspect, a method may facilitate control of an aircraft. An actuator that is communication with one or more processing devices may be controlled based at least in part on one or a combination of the following. A first control signal may be output, with a first command module, to control the actuator. The first command module may include a first electronic configuration. A second control signal may be output, with a second command module, to control the actuator when the first command module is deactivated or malfunctioning. The second command module may include a second electronic configuration that is different from the first electronic configuration. One or more commands generated by the first command module and/or one or more system response signals that are based at least in part on one or more sensors may be monitored with a monitor module. The monitor module may include a third electronic configuration that is different from the first electronic configuration and the second electronic configuration. The actuator may be controlled using the second control signal when the first command module is deactivated or malfunctioning.

In various embodiments, the first electronic configuration may be a first hardware configuration, and the second electronic configuration may be a second hardware configuration that is different from the first hardware configuration. In various embodiments, the first electronic configuration may be a first software configuration, and the second electronic configuration may be a second software configuration that is different from the first software configuration. In various embodiments, the system may include a propulsion system that may include the actuator. The controller may at least partially control the propulsion system based at least in part on the first control signal or the second control signal. In various embodiments, the propulsion system may further include a propeller, and the actuator may be coupled to the propeller. In various embodiments, the aircraft may be an autonomous aircraft. In various embodiments, the controller may be configured to select the second command module for controlling the actuator in response to determining that the first command module is deactivated or malfunctioning.

In various embodiments, the first command module may receive a set of one or more input signals from a set of sensors corresponding to the one or more sensors and may generate the first control signal based at least in part on the set of one or more input signals. The monitor module may receive the set of one or more input signals from the set of sensors. The monitor module may generate a monitor signal based at least in part on the set of one or more input signals, may compare the first control signal generated by the first command module to the monitor signal, and may transmit the first control signal to the actuator if the first control signal matches the monitor signal. In various embodiments, the monitor module may suppress the first control signal when the first control signal differs from the monitor signal. The second control signal may be transmitted to the actuator when the first control signal is suppressed. In various embodiments, the second command module may receive the set of one or more input signals from the set of sensors and generates the second control signal based at least in part on the set of one or more input signals.

In various embodiments, the system may be configured to generate an alert when the actuator is controlled using the second control signal when the first command module is deactivated or malfunctioning.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by either following the reference label by a dash and a second label that distinguishes among the similar components or following the reference label by parentheses enclosing a second label that distinguishes among the similar components. If only the first reference label is used in the specification, the description is applicable to any one of the similar components having the same first reference label irrespective of the second reference label.

DETAILED DESCRIPTION

Figure 1A:
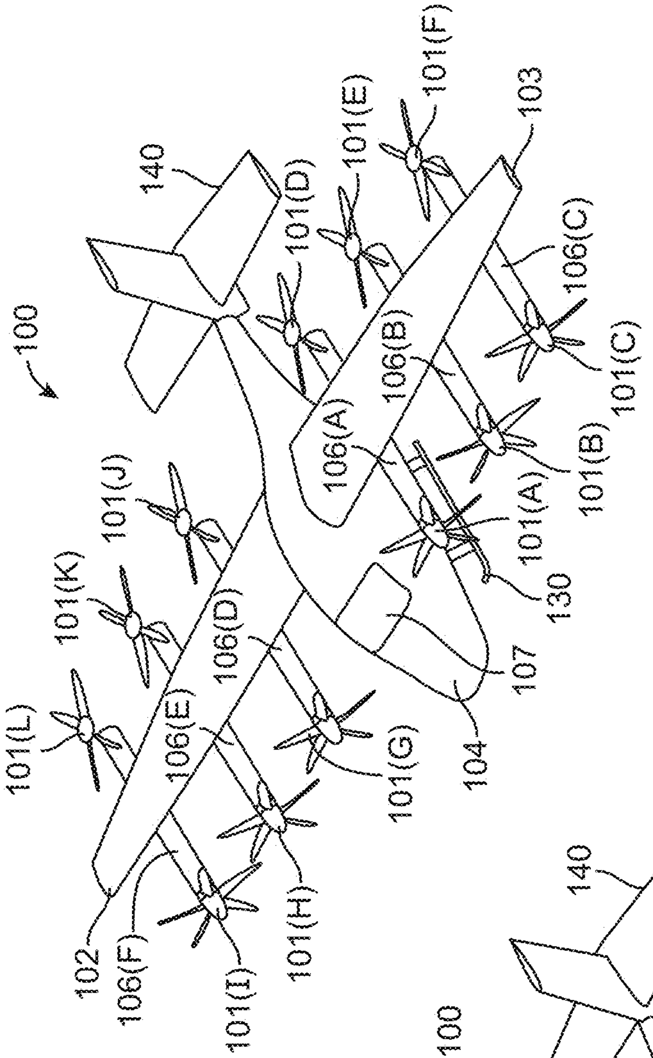
FIGS. 1A and 1B depict perspective views of an exemplary aircraft with tilting fans in forward and vertical configurations, respectively, in accordance with embodiments according to the present disclosure.

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

An aircraft may include a control system, such as a flight control system, which may be configured to control the aircraft. In some embodiments, the aircraft may include an electric vertical take-off and landing (eVTOL) or an electric conventional take-off and landing (eCTOL) aircraft. According to various embodiments, the eVTOL or eCTOL aircraft may be an autonomous aircraft. A control system may be configurable to control the aircraft automatically and/or based on remote control commands. In some embodiments, the aircraft may be a piloted aircraft.

For example, a control system may control when one or more propulsion systems should be operated, the amount of power provided to the propulsion systems, and/or other parameters and settings associated with the propulsion systems. A control system may control the propulsion systems based on input received from sensor data and/or flight data received from the sensors (e.g., sensors measuring air temperature, electric motor temperature, airspeed of the aircraft, etc.), computers, and other input/output devices coupled to the aircraft.

A control system may include one or more controllers. Each controller may be configured to control one or more actuators of a propulsion system (or other aircraft components such as actuators). In conventional systems, each controller may include similar electronic components (e.g., hardware and/or software). This may be problematic as each of the controllers may have the same or similar vulnerabilities, and the controllers could potentially all fail at the same time due to the same root cause.

In the case of failure of electronic control systems, traditional aircraft may include primitive backup control mechanisms such as a human pilot's manual control. However, a human may not be able to manually pilot aircraft with more complex components. In some embodiments, a human pilot may not be onboard to assume manual control (e.g., in case of an autonomous aircraft).

Embodiments according to the present disclosure may provide a controller system with a backup control module that may provide flight control functions in case of failure of a primary control module. The backup control module may be electronically different (e.g., having different hardware and/or software) from the primary control module. As a result, an event or other cause of failure that may result in operational failure of one or more primary control modules may not result in operational failure of the backup control module, and therefore may prevent failure of the one or more actuators and failure of aircraft propulsion system(s).

Figure 1B:
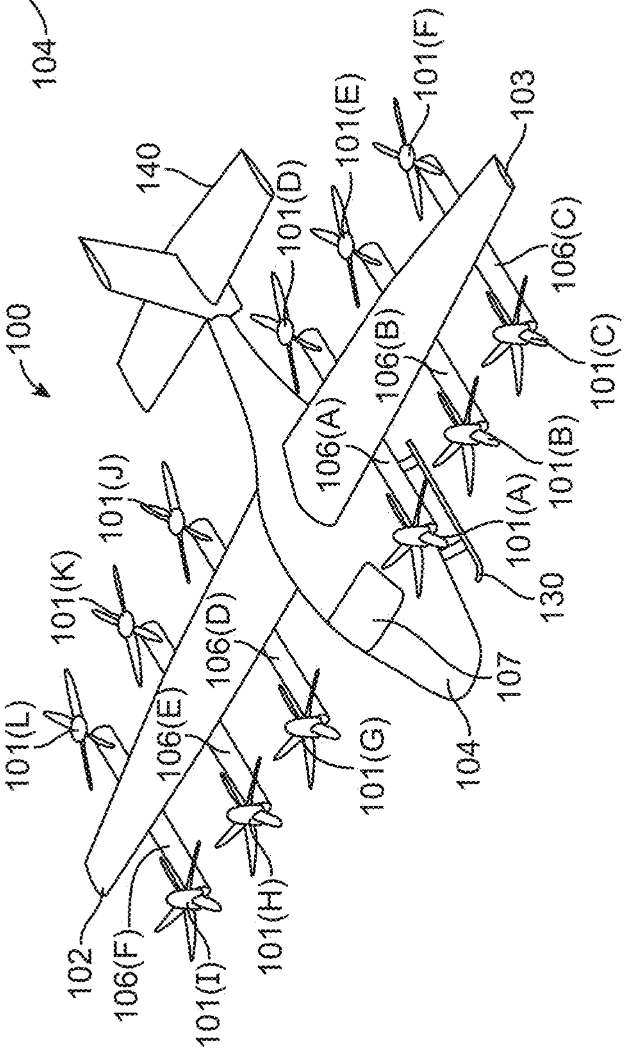

FIG. 1A depicts a perspective view of an exemplary aircraft with tilting fans in a forward flight configuration, in accordance with embodiments according to the present disclosure. FIG. 1B depicts a perspective view of an exemplary aircraft with tilting fans in a vertical flight (e.g., lift) configuration, in accordance with embodiments according to the present disclosure. In various embodiments, the aircraft 100 may be any suitable type of flying vehicle, such as an airplane, a helicopter, a drone or a hybrid-type flying vehicle. In some embodiments, the aircraft 100 may be capable of vertical takeoff and landing (VTOL). The aircraft 100 may be configured for human piloting, remote piloting, and/or autonomous flight. In some embodiments, the aircraft 100 may be an autonomous eVTOL aircraft.

In the example shown, the aircraft 100 includes a fuselage 104 that may include a cabin section (e.g., toward the nose) for carrying passengers and/or cargo. A pair of wings, including a first wing 102 and a second wing 103, may be mounted on, or otherwise attached to, the fuselage 104. The pair of wings may be coupled to opposite sides of the fuselage and may have any suitable shape and configuration. For example, the pair of wings may be rectangular straight wings, tapered straight wings, rounded or elliptical straight wings, swept wings, delta wings, or any other suitable type of wing. In some embodiments, the first wing 102 and the second wing 103 may be coupled to the fuselage 104 in a high-wing configuration. That is, the first wing 102 and the second wing 103 may be mounted on an upper portion of the fuselage 104, as shown in FIGS. 1A and 1B. In some embodiments, the aircraft may include a single wing that is coupled to the fuselage.

The aircraft 100 may also include support structures 106(A)-(F), which may be coupled to the wings 102, 103. As shown in FIGS. 1A and 1B, each of the support structures 106(A)-(F) may take the form of a boom, though various embodiments may include any other suitable structure. Six support structures 106(A)-(F) are shown in FIGS. 1A and 1B, where three support structures 106(A)-(F) are provided under each wing of the pair of wings 102, 103. The support structures 106(A)-(F) may be coupled to the undersides of the pair of wings and may include a forward portion extending forward beyond the wing and an aft portion extending aft of the wing.

In some embodiments, each of the support structures 106(A)-(F) may be identical, and therefore the support structures 106(A)-(F) may be interchangeable between the positions on the wings. For example, a first support structure 106(A) closer to the fuselage may be interchangeable with an adjacent second support structure 106(B) (e.g., the middle boom on the wing) or a further third support structure 106(C) (e.g., the boom furthest away from the fuselage).

Propulsion Systems

The aircraft 100 may also include propulsion systems 101(A)-(L). While twelve propulsion systems 101(A)-(L) are shown in FIGS. 1A and 1B, any suitable number of propulsion systems 101(A)-(L) may be included. The propulsion systems 101(A)-(L) may be coupled to the pair of wings 102, 103 and may be divided equally between the wings. In some embodiments, as shown in FIGS. 1A and 1B, one or more of the propulsion systems 101(A)-(L) may be mounted on the support structures 106(A)-(F). For example, pairs of propulsion systems 101(A)-(L) may be mounted on opposite ends of a respective support structure 106(A)-(F), with one propulsion system mounted forward of the wing and another propulsion system mounted aft of the wing. In other embodiments, one or more of the propulsion systems 101(A)-(L) may be coupled directly to the wings. The number of booms and/or propulsion systems may vary according to the flight needs and requirements of the aircraft 100.

According to various embodiments, each of the propulsion systems 101(A)-(L) may be configured to provide thrust to the aircraft 100. The thrust from one or more of the propulsion systems 101(A)-(L) may be used to move, control, and/or stabilize the aircraft 100. The propulsion systems 101(A)-(L) may take the form of any suitable mechanism for providing thrust. In one example, a propulsion system 101 may include a rotor (e.g., a fan). A propulsion system 101 may also include a drive mechanism for the rotor, such as a dedicated electric motor (e.g., in the case of electric vehicles).

A rotor may include any suitable number of rotor blades (e.g., 2 blades, 3 blades, 4 blades, 5 blades, 6 blades, 7 blades, or 8 blades). The rotor blades may have a predetermined angle of attack. In some embodiments, all rotor blades may have the same angle of attack. In other embodiments, at least two rotor blades may have different angles of attack than each other. The rotor blades may be spaced equally or unequally. The rotor may further include a hub. The rotor blades may be attached to the hub. In some embodiments, the rotor blades and an integral hub may be manufactured as a single piece. The hub may provide a central structure to which the rotor blades connect and, in some embodiments, may be made in a shape that envelops the motor.

In some embodiments, the motor parts may be low-profile so that the entire motor fits within the hub of the rotor, presenting lower resistance to the air flow when flying forward. The rotor may be attached to the rotating part of the motor. The stationary part of the motor may be attached to a support structure. In some embodiments the motor may be a permanent magnet motor and may be controlled by an electronic motor controller. The electronic motor controller may send electrical currents to the motor in a precise sequence to allow the rotor to turn at a desired speed or with a desired torque.

According to various embodiments, one or more of the propulsion systems 101(A)-(L) may be positioned, oriented, and/or otherwise configured to provide thrust and/or movement to the aircraft 100 in a predefined direction. For example, one or more of the propulsion systems 101(A)-(L) may be configured to provide thrust upward in a vertical direction. As shown in FIGS. 1A and 1B, these may include propulsion systems 101(A), 101(D), 101(E), 101(F), 101(G), 101(J), 101(K), and/or 101(L). Propulsion systems 101(A)-(L) that are configured to provide thrust in a vertical direction may also be referred to as vertical fans or lift fans. Vertical fans may be used to generate vertical thrust (e.g., lift) for taking off, landing, hovering, stabilizing, and/or controlling the aircraft 100.

According to various embodiments, one or more of the propulsion systems 101(A)-(L) may have a fixed orientation. For example, one or more of the propulsion systems 101(A)-(L) may be mounted in a fixed orientation relative to a respective wing 102 or 103, a respective support structure 106(A)-(F), and/or the aircraft 100. While the rotor blades of a fixed propulsion system may rotate when activated, the orientation of the propulsion system housing and structure may not be rotatable with respect to the aircraft 100. As a result, a fixed propulsion system may be configured to provide thrust in a constant direction relative to the aircraft 100. The thrust direction and orientation of a fixed propulsion system relative to the aircraft 100 (e.g., the fuselage, wings, and/or support structures) may not change or move, regardless of the current aircraft 100 activities and/or direction of movement (e.g., both forward flight and vertical flight), according to embodiments.

In other embodiments, one or more of the propulsion systems 101(A)-(L) may be configured to change orientation. For example, one or more of the propulsion systems 101(A)-(L) may be mounted in a manner that allows the orientation to be tiltable relative to a respective wing 102 or 103, a respective support structure 106(A)-(F), and/or the aircraft 100. As a result, a tilting propulsion system, which may be referred to as a tilting fan, may be configured to provide thrust in more than one direction relative to the aircraft 100. A tilting fan may be coupled to a respective support structure 106(A)-(F) via one or more tilting mechanisms including, for example, a motor and a coupling mechanism. A tilting mechanism may be controllable and/or configured to change or move the orientation and thrust direction of a tilting fan relative to the aircraft 100 (e.g., the fuselage, wings, and/or support structures) based on current aircraft 100 activities, needs, and/or direction of movement (e.g., forward flight, vertical flight), according to various embodiments.

A rotor blade of a propulsion system 101 may be configured to have a certain blade pitch. The blade pitch of a rotor blade refers to the angle of the blade. Blade pitch may be measured relative to the aircraft body, a spinner of the propulsion system, or a plane of rotation. Blade pitch may be normally described as a ratio of forward distance per rotation, assuming no slip. Typically, a low pitch (also referred to as fine pitch) may yield good low-speed acceleration and climb rate in an aircraft, while high pitch (also referred to as coarse pitch) may optimize high-speed performance and fuel economy.

According to embodiments, one or more rotor blades of a propulsion system 101 may have adjustable pitch settings. Such a propulsion system may be referred to as a variable pitch propeller. In a variable pitch propeller, the blade pitch of one or more rotor blades may be adjusted during flight. The blade pitch may thus be adjusted to optimize for thrust and/or efficiency based on a phase of flight, such as takeoff, climb or cruise. For example, a fine pitch setting may be used during take-off and landing, while a coarser pitch may be used for high-speed cruise flight. An example of a high pitch used during cruise flight is about 40 degrees.

Any suitable mechanisms may be included to enable pitch adjustments. For example, a rotor blade may be coupled to a respective spinner via one or more pitching mechanisms including, for example, a motor and a coupling mechanism. A pitching mechanism may be controllable and/or configured to change or move the pitch position of a rotor blade relative to the spinner (or other parts of the propulsion system) based on current aircraft 100 activities, needs, and/or direction of movement (e.g., forward flight, vertical flight), according to embodiments.

Control System

According to various embodiments, the aircraft 100 may be an electrically powered aircraft or a hybrid-electric aircraft. One or more battery units may be included in the aircraft 100 (e.g., within the fuselage 104) and may be configured to provide power to various aircraft components, such as one or more electric motors and/or on-board computer systems. The propulsion systems 101(A)-(L) may be driven by electric motors that are powered by an electric power system including the one or more battery units. In some embodiments, each of the propulsion systems 101(A)-(L) may be coupled to a dedicated battery unit. Alternatively, there may be a one-to-many relationship between the one or more battery units and the propulsion systems 101(A)-(L). In some cases, one or more battery units may be the sole power source for the aircraft 100. Each battery unit may include one or more battery cells.

According to various embodiments, the aircraft 100 may include a central control computer 107, such as a flight control system, which may be configured to control the aircraft 100. The central control computer 107 may be configurable to control the aircraft 100 automatically and/or remotely (e.g., via a control signal received from a remote entity, such as a remote controller, a remote pilot or a remote-control tower). In various embodiments, the central control computer 107 may include one or more computers with one or more non-transitory, computer-readable medium storing instructions and one or more processors configured to execute the instructions in order to perform the processing and control functions described herein.

For example, the central control computer 107 may control when the propulsion systems 101(A)-(L) should be operated and/or the amount of power provided to the propulsion systems 101(A)-(L). The central control computer 107 may be configurable to control the propulsion systems 101(A)-(L) independently from one another. According to various embodiments, the central control computer 107 may control the propulsion systems 101(A)-(L) based on input received from a remote controller (e.g., a remote pilot), input received from an autopilot, sensor data and/or flight data received from the sensors (e.g., sensors measuring air temperature, electric motor temperature, airspeed of the aircraft, etc.), computers, and other input/output devices coupled to the aircraft.

The central control computer 107 may also control one or more tilting mechanisms to switch the positioning of one or more tilting fans from the forward flight position to the vertical position, as well as from the vertical position to the forward flight position. According to various embodiments, the central control computer 107 may control the tilting fans between the two positions based on sensor data and/or flight data received from the sensors (e.g., sensor measuring air temperature, electric motor temperature, airspeed of the aircraft, etc.), computers, and other input/output devices coupled to the aircraft.

The central control computer 107 may further control one or more pitching mechanisms to switch the positioning of one or more rotor blades between two or more pitch positions. According to various embodiments, the central control computer 107 may control the rotor blade pitch positions based on sensor data and/or flight data received from the sensors (e.g., sensor measuring air temperature, electric motor temperature, airspeed of the aircraft, etc.), computers, and other input/output devices coupled to the aircraft.

Accordingly, the central control computer 107 may be configured to translate pilot or other operator input, and/or corrections computed by an onboard computer, into forces and moments and/or to further translate such forces and moments into a set of actuators (e.g., vertical lift rotors; propellers; control surfaces, such as ailerons; etc.) and/or associated parameters (e.g., lift fan power, pitch, speed, or torque) to provide the required forces and moments. For example, pilot or other operator inputs may indicate a desired change in the aircraft's speed, direction, and/or orientation, and/or wind or other forces may act on the aircraft, requiring the propulsion systems and/or other actuators to be used to maintain a desired aircraft attitude (roll/pitch/yaw), speed, and/or altitude.

Backup Controller Module

The aircraft may include one or more controllers 200 that are local to one or more actuators (e.g., a controller 200 may be adjacent to an actuator, in some embodiments). For example, each propulsion system, or a pair of propulsion systems, may have a dedicated controller configured to control one or more actuators of the propulsion system (e.g., power, tilt, pitch, etc.). Embodiments may allow any suitable number of controllers for any suitable number of actuators to be included in the aircraft 100 and located in any suitable location of the aircraft 100.

Figure 2:
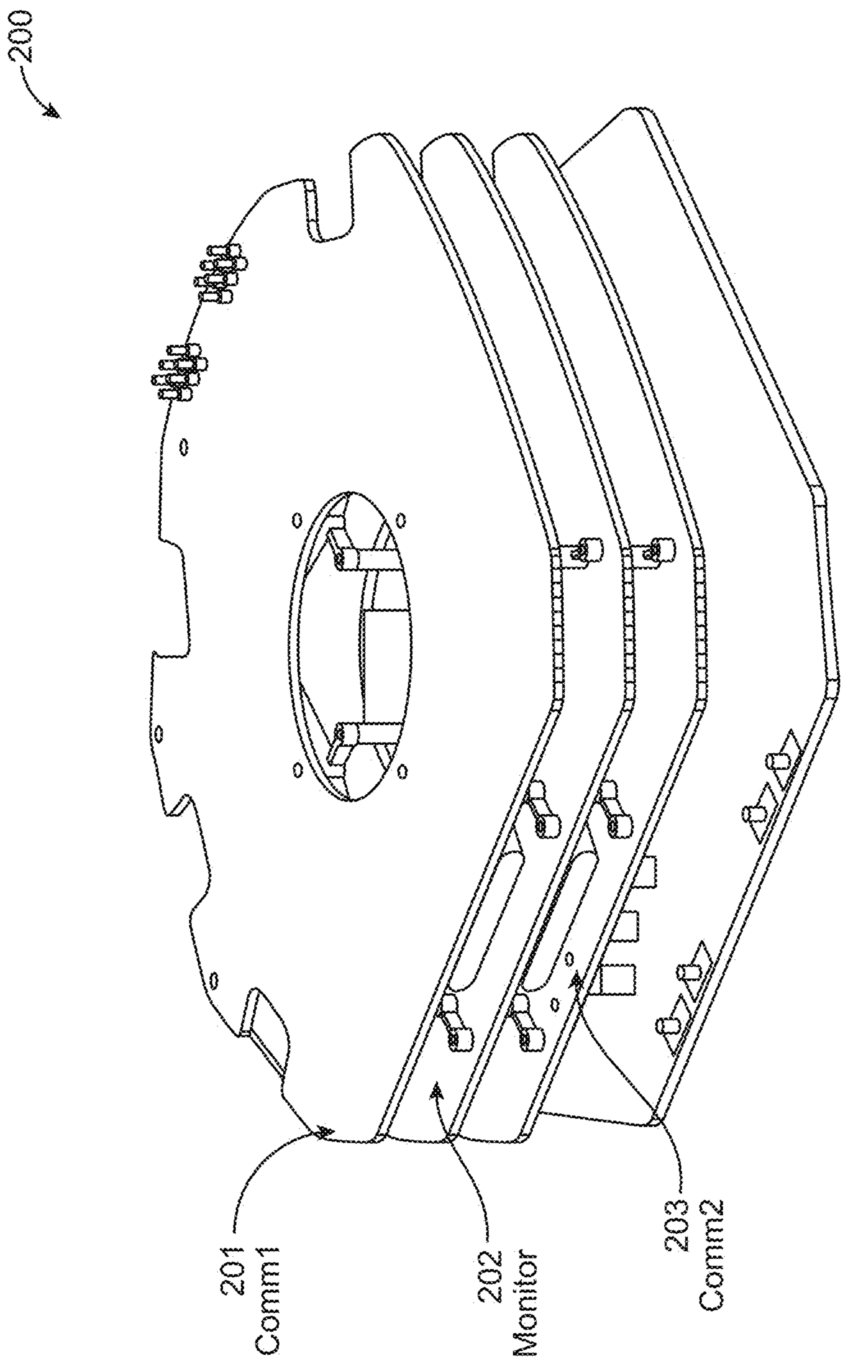
FIG. 2 shows an example of an assembled controller, in accordance with embodiments according to the present disclosure.

FIG. 2 shows an example of a simplified controller 200, in accordance with embodiments according to the present disclosure. The controller 200 may include a first command module 201, a monitor module 202, and a second command module 203. Each of the first command module 201, the monitor module 202, and the second command module 203 may be mounted on a chassis, tower frame, and/or any other suitable structural support.

Each of the first command module 201, the monitor module 202, and/or the second command module 203 may take the form of an electronic device. For example, electronic devices may include a printed circuit board assembly (PCBA), a Field Programmable Transistor Array (FPTA), one or more computer processors (e.g., microprocessors), and/or any other suitable electronic hardware components. An electronic device may also include any suitable software with instructions for performing one or more processes.

Each of the first command module 201, the monitor module 202, and/or the second command module 203 may be configured to receive information from one or more sensors, as well as information related to a flight path, flight direction, or flight instructions. The first command module 201, the monitor module 202, and/or the second command module 203 may further be configured to determine, based on the sensors and other flight information, one or more command instructions to control one or more actuators or other aircraft components to provide a desired flight result. According to various embodiments, each of the first command module 201, the monitor module 202, and/or the second command module 203 may have a different electronic configuration. For example, the first command module 201 may have a first electronic configuration, the second command module 203 may have a second electronic configuration, and the monitor module 202 may have a third electronic configuration.

The controller 200 may be configured to provide a dual lane with backup architecture. The monitor module 202 may be configured to monitor the command module 201. For example, the monitor module 202 may further be configured to receive and analyze commands generated by the first command module 201 and to determine whether the commands are correct. In some embodiments, the monitor module 202 may compare locally generated commands (i.e., monitor signals) at the monitor module 202 with the commands received from the first command module 201 to determine whether they match within a predetermined threshold. For example, the monitor module 202 may be configured to monitor signals from one or more vehicle management system computers (VMSCs) and replicate commands responsive to the signals with a set of operations, hardware configuration, and/or software configuration that has some degree of dissimilarity with respect to the first command module 201. Additionally or alternatively, the monitor module 202 may be configured to generate the commands (i.e., monitor signals) based at least in part on the set of one or more input signals that the monitor module 202 receives (e.g., by way of a drive health monitor 241 depicted in FIG. 3) from one or more sensors of the one or more actuators. Thus, the monitor module 202 may compute the commands that the command module 201 should be computing. In this way, the monitor module 202 may simultaneously create reference monitor signals in a second lane that shadow the command line in a first lane that is being monitored.

Figure 3:
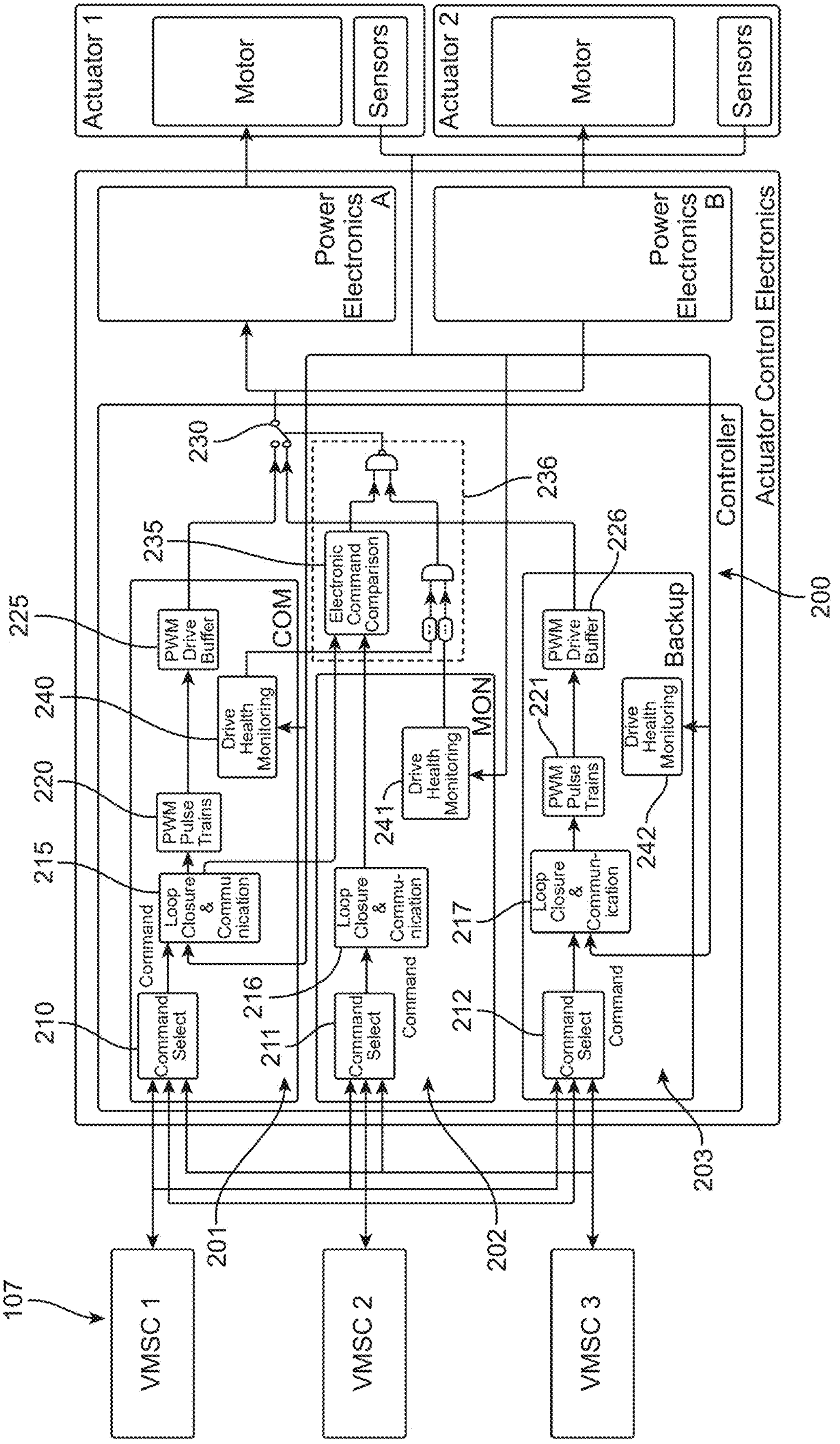
FIG. 3 depicts an example of a controller within the context of a larger control system, in accordance with embodiments according to the present disclosure.

The command signals in the first lane (i.e., one or more first control signals) and the reference signals generated by way of secondary computations in the second lane (i.e., one or more monitor signals) may be compared by the monitor module 202 with an integrated or separate comparison logic component, which, for example, may correspond to switch control logic 236 (which is depicted in FIG. 3 and may be part of the MON lane in some embodiments). When the command signals in the first lane are determined to match the monitor signals in the second lane, the command signals in the first lane may be transmitted (e.g., in various embodiments, by the first command module 201 or the monitor module 202) to the actuators 1 and/or 2 (e.g., by way of a switch 230 depicted in FIG. 3 that may be independent of the command module 201 as shown). When there is a discrepancy between the two lanes such that one or more commands generated by the first command module 201 do not match one or more monitor signals generated by the monitor module 202, this may be taken as an indication of the first command module 201 malfunctioning (or deactivated, for example, in the case that the monitoring module 202 and/or the switching logic 236 determines that there is no signal or a signal that indicates deactivation from the first control module 201). Consequently, a flag may be generated that triggers the switch 230, which may be included in, or separate from, one or more of the central control computers 107 (e.g., VMSCs) in various embodiments, to switch to the second command module 203 so that the second command module 203 controls one or more actuators. The switch 230 may be controlled directly or via one or more of the control systems in various embodiments. Accordingly, the monitor module 202 may be configured to prevent/suppress a command (i.e., a first control signal) from the first command module 201 from being used to control an actuator or aircraft component if the command does not match or is otherwise disagreed with or disapproved of by the monitor module 202. In such an event, the controller 200 (e.g., the monitoring module 202, using the switch control logic 236) may cause the switch 230 to electrically disconnect the first command module 201 from the one or more actuators and to electrically connect the second command module 203 to the one or more actuators so that one or more commands from the second command module 203 (i.e., one or more second control signals) are transmitted to the one or more actuators.

According to embodiments, the second command module 203 may be configured to provide a backup option in case of failure or other error of the first command module 201. For example, if the monitor module 202 and the first command module 201 disagree about a next action, the second command module 203 may take over the operations of the controller and may provide a command to an actuator controlled by the controller 200. According to various embodiments, the second command module 203 may not be associated with a monitoring module. That is, the second command module 203 may not be actively monitored. In the case that the command/monitor pair (e.g., the first command module 201 and the monitor module 202) is found to be invalid or erroneous, the backup module (e.g., the second command module 203) may resume control of the controller 200.

The second command module 203 (which may also be referred to as a backup control module) may be electronically dissimilar from the first command module 201 (which may also be referred to as a primary control module) in one or more ways. Likewise, in some embodiments, the monitor module 202 may also be electrically dissimilar from the first command module 201 and/or the second command module 203 (e.g., three sets of electrically distinct modules). For example, the first command module 201, the monitoring module 202, and the second command module 203 may each include one or more different hardware components (e.g., processors, configuration, other circuitry, etc.) than the others. Additionally or alternatively, the first command module 201, the monitoring module 202, and the second command module 203 may each include one or more different software components (e.g., programming language, programmed instructions, etc.) than the others. According to various embodiments, the second command module 203 is functionally similar to the first command module 201. In some embodiments, while the second command module 203 may still be configured to provide one or more control functions for one or more actuators, the second command module 203 may electrically and/or functionally simpler, with a simpler hardware and/or software configurations, than the first command module 201, being less complex and, therefore, potentially more efficient and more reliable.

An event or other cause of malfunction at the first command module 201 may be related to the electronics and configuration of the first command module 201. Advantageously, the second command module 203 may not be affected by the same event or triggers due to the difference in electronics at the second command module 203. As a result, the second command module 203 may still be operational during situations when the first command module 201 is not operational. The same controller may continue functioning by using the second command module 203, even when the first command module 201 is unavailable. This complex redundancy may improve the safety of the aircraft 100, as well as satisfy safety-based certification standards.

Referring back to FIG. 1, the aircraft 100 may include, as an example, twelve propulsion systems 101(A)-(L). To maintain control during flight of the aircraft 100, the set of propulsion systems 101(A)-(L) may be operated in precise coordination. The central control computer 107 may be configured to quickly process sensor data to determine, in each passing moment, how to operate each of the propulsion systems 101(A)-(L) as well as other control surfaces and components on the aircraft 100. In some embodiments, this complex arrangement of control components may be beyond the capabilities of a human pilot to operate. From a human pilot perspective, there may be too many independent components to control, and the speed and complexity of the calculations and adjustments are outside of human abilities. Accordingly, it may not be feasible to rely on human operators to manually pilot the aircraft 100 in a situation where the first command module 201 becomes compromised. Accordingly, the second command module 203 may provide a new type of redundancy for flight operations, in that it enables to controller to continue controlling the complex mechanisms of the aircraft 100 even if the first command module 201 fails, instead of relying on a more primitive backup control option (e.g., manual human piloting) that may not be sufficient for certain types of aircraft.

FIG. 3 depicts an example of a controller 200 within the context of a larger control system, according to embodiments. One or more vehicle management system computers (VMSCs 1, 2, and 3), may be in communication with each of the first command module 201, the monitor module 202, and the second command module 203. The VMSCs 1, 2, and 3 may be a part of the central control computer 107 described above with respect to FIGS. 1A and 1B. The central control computer 107 (e.g., the VMSCs 1, 2, and 3) may determine, based on communications with the first command module 201, the monitor module 202, and the second command module 203, whether to activate the second command module 203.

The first command module 201, the monitor module 202, and the second command module 203 may respectively include command select components 210, 211, 212 configured to receive signals from the VMSCs 1, 2, and 3 and generate corresponding commands. The command select component 211 of the monitor module 202 may simultaneously create reference signals in a second lane that shadow the command line in a first lane that is being monitored and that includes the command select component 210. The first command module 201, the monitor module 202, and the second command module 203 may respectively include loop closure and commutation components 215, 216, and 217, each configured to received commands from their respectively, communicatively coupled command select components 210, 211, 212. The loop closure and commutation components 215 and 217 may be respectively, communicatively coupled to pulse width modulator (PWM) pulse trains components 220, 221 configured to generate pulse train signals to respective PWM drive buffers 225, 226.

The PWM drive buffers 225, 226 may be communicatively coupled to a switch 230 configured to switch between the PWM drive buffers 225, 226 to selectively connect one of the PWM drive buffers 225, 226 to power electronics A and B, which respectively drive the motors of actuator 1 and 2. Accordingly, the first command module 201 may be configured to output control signals (e.g., a first control signal, a first set of one or more controls, etc.) to control the actuators 1 and 2, and the second command module 203 may be configured to output control signals (e.g., a second control signal, a second set of one or more controls, etc.) to control the actuators 1 and 2. In some embodiments, the second command module 203 may output control signals for the actuators 1 and 2, even though the switch 230 is not electrically connecting the second command module 203 to the power electronics A and B and, hence, the actuators 1 and 2. In other embodiments, the second command module 203 may output control signals for the actuators 1 and 2 only when the switch 230 electrically connects the second command module 203 to the power electronics A and B and, hence, the actuators 1 and 2.

The loop closure and commutation components 215, 216 may be communicatively coupled to an electronic command comparison component 235 that may be part of switch control logic 236. In some embodiments, the command comparison component 235 and/or the switch control logic 236 may be separate from the monitor module 202. In some embodiments, the monitor module 202 may include the command comparison component 235 and/or the switch control logic 236; thus, the switch control logic 236 may be part of the MON lane. Drive health monitors 240, 241, 242 may be configured to monitor the actuators 1, 2 via communicatively coupled sensors of the actuators 1, 2. Accordingly, for example, the first command health module 201 may receive a set of one or more input signals from the sensors by way of the coupled drive health monitor 240, and, in some embodiments, the first command health module 201 may generate output control signals (e.g., a first control signal) based at least in part on one or more input signals from the one or more sensors associated with the one or more actuators. The monitor module 202 may likewise receive the set of one or more input signals from the sensors by way of the coupled drive health monitor 241, and, in some embodiments, the monitor module 202 may generate monitor signals based at least in part on the one or more input signals from the one or more sensors associated with the one or more actuators. The second command module 203 may likewise receive the set of one or more input signals from the sensors by way of the coupled drive health monitor 242, and, in some embodiments, the second command health module 203 may generate output control signals (e.g., a second control signal) based at least in part on the one or more input signals from the one or more sensors. Outputs of the drive health monitors 240, 241 may be provided to the switch control logic 236.

According to some embodiments, VMSC 3 may be a dissimilar backup VMSC that computes commands for the second command module 203. That is, VMSC 3 may be dissimilar from VMSC 1 and VMSC 2 that compute commands for the first command module 201 and the monitor module 202, respectively. Accordingly, the backup controller (i.e., the second command module 203) may be dependent on the flight control computer (FCC) (e.g., VMSC) computed commands due to the greatly increased complexity of controlling eVTOLs as opposed to conventional jet transports. This provides FCC redundancy for the eVTOL aircraft.

In various embodiments, if instructions and/or flight analysis received from the first command module 201 are not verified by information received from the monitor module 202, one or more of the VMSC 1, 2, and 3 or the controller 200 may determine to deactivate, disconnect, or otherwise ignore the first command module 201. The VMSC 1, 2, and/or 3 or the controller 200 may then activate or otherwise enable the second command module 203 to provide control signals to the power electronics A and B for the motors of the actuators 1 and 2, for example, by switching the switch 230 to electrically disconnect the first command module 201 from the power electronics A, B and to electrically connect the second command module 203 to the power electronics A, B. According to various embodiments, an alert may be provided to a controller of the aircraft (e.g., a remote supervisor monitoring the flight of an unmanned aircraft) when the first command module 201 is deactivated and/or malfunctioning and the second command module 203 provides control signals for the actuators 1 and 2. In some embodiments, a flight path of the aircraft may be altered when the backup controller (i.e., the second command module 203) is activated. For example, a failsafe fight path may be activated to securely land the aircraft.

In some embodiments, if instructions and/or flight analysis received from the first command module 201 are not verified by information received from the monitor module 202, the controller 200 (e.g., with the monitor module 202 using switch control logic 236) may determine to deactivate, disconnect, or otherwise ignore the first command module 201 (e.g., using switch control logic 236). For example, when the controller 200 (e.g., with the monitor module 202 using switch control logic 236) detects that one or more commands generated by the first command module 201 do not match one or more reference commands generated by the monitor module 202, the controller 200 may switch (e.g., with the monitor module 202 using switch control logic 236) from the first command module 201 to the second command module 203 by way of controlling the switch 230 to electrically disconnect the first command module 201 from the power electronics A, B and to electrically connect the second command module 203 to the power electronics A, B. While the activation of the switch 230 from the first command module 201 to the second command module 203 may be caused by one or more of the VMSC in some embodiments, the activation of the switch 230 may be caused by the controller 200 in some embodiments (e.g., by operation of the switch control logic 236 that may be integrated with the monitor module 202 or separate therefrom in various embodiments).

In some embodiments, a controller may include two or more pairs of a primary control module and a monitor module for redundancy purposes. A backup control module may be provided in such controllers to generate the control signal for the controller in the event that the multiple pairs of primary control module and monitor module fail.

Figure 4:
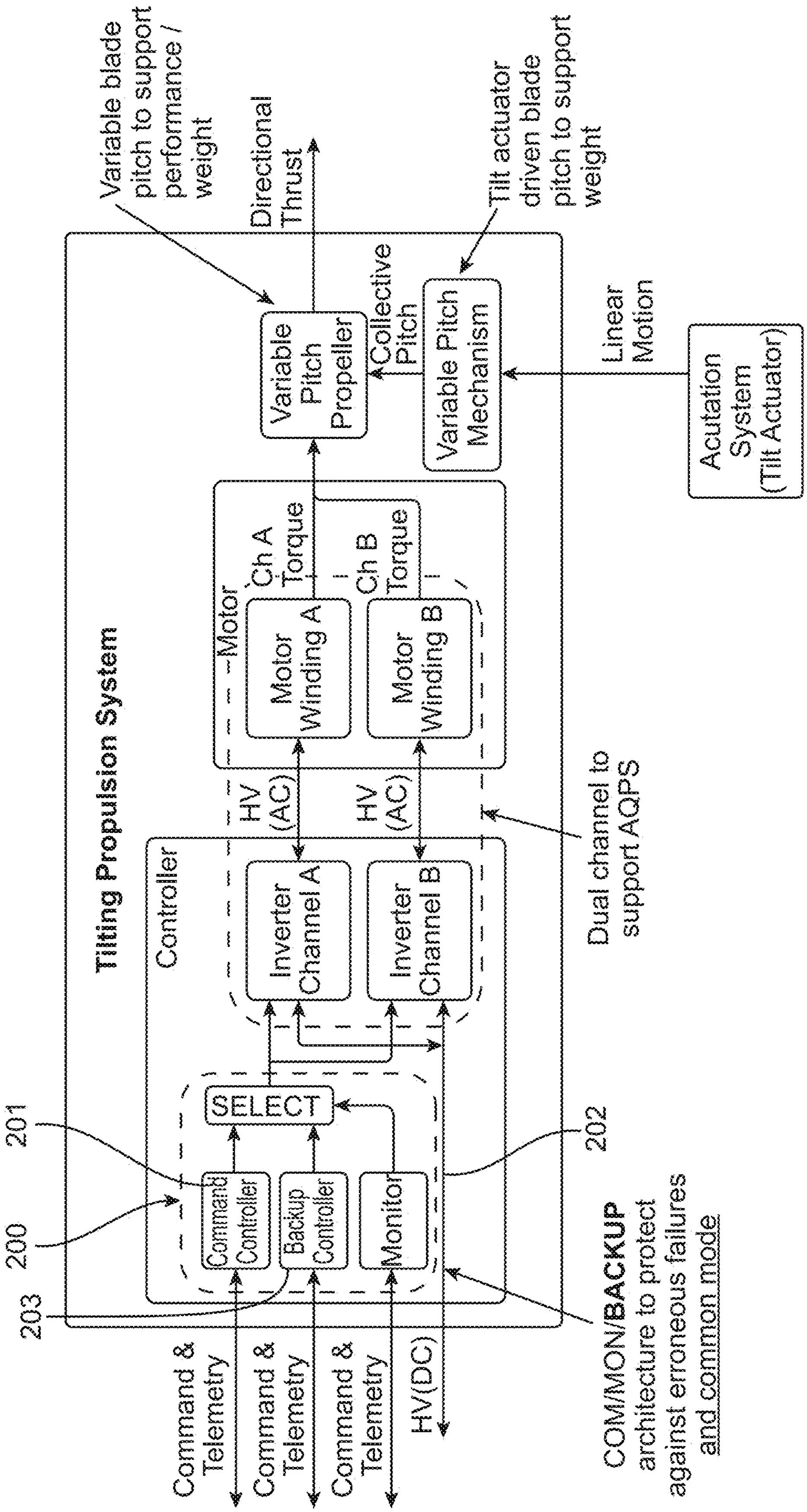
FIG. 4 depicts an example of a system architecture for a tilting propulsion system with a backup command module, according to embodiments.
Figure 5:
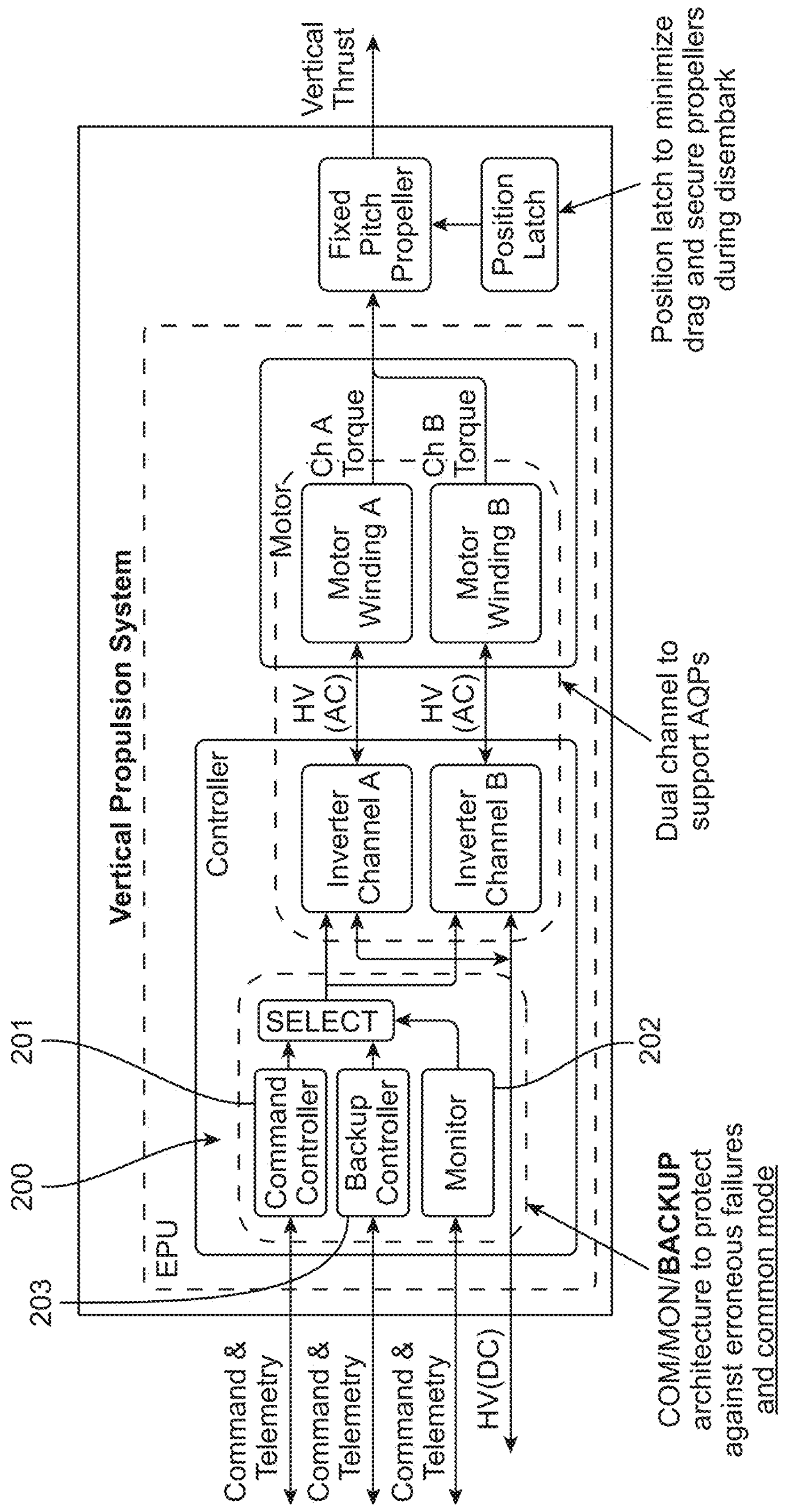
FIG. 5 depicts an example of a system architecture for a vertical propulsion system with a backup command module, according to embodiments.

FIGS. 4 and 5 depict examples of a hardware system architecture for a propulsion system that includes a backup command module, according to embodiments. FIG. 4 illustrates the architecture of a tilting propulsion system, while FIG. 5 illustrates the architecture of a fixed vertical propulsion system. Both of the architectures may include a controller 200 with a command module, a monitor modulate, a comparison module, and DC voltage inverters. The controllers 200 may be coupled to motors, which in turn may be coupled to propellers. The tilting propulsion system of FIG. 4 may include a variable pitch propeller and a tilt actuator, while the vertical propulsion system of FIG. 5 may include a fixed pitch propeller.

The architectures illustrated in FIGS. 4 and 5 may further include a second command module 203 that is in communication with the select module (e.g., in addition to the first command module 201, the monitor module 202). As a result, the second command module 203 may provide a redundant complex electronic hardware component that may be distinct from the first command module 201, as discussed above. As noted in FIGS. 4 and 5, the second command module 203 may provide new protection against common mode failures, as the first command module 201 and the second command module 203 include different electronics and thus may not be susceptible to the same failure modes.

Embodiments may provide robust fault containment and control of each actuator by means of a dissimilar command and monitor modules (e.g., COM/MON lane pair) with a third dissimilar backup module in each controller 200. Embodiments may provide a dissimilar command/monitor module pair to provide high integrity detection of erroneous operation of either of the complex electronic devices that make up the command/monitor module pair. In the case of a failure or erroneous operation of one of these modules, the controller 200 may hand off control to the dissimilar backup lane, allowing for continued operation. Embodiments may allow for continued operation of a given type of controller 200 following the failure of a complex electronic device (e.g., in the case of a common mode failure which disables all devices of a specific type). As such, embodiments mitigate the impact of common mode failures of complex electronic devices. The controller 200, including the backup command module, as described herein may be used with actuation control electronics and propulsion engine control units.

Various embodiments may provide an aircraft comprising a fuselage; a pair of wings coupled to opposite sides the fuselage; one or more propulsion systems coupled to a first wing of the pair of wings; and one or more propulsion systems coupled to a second wing of the pair of wings. Each propulsion system may include a propeller; an actuator coupled to the propeller; and a controller in communication with the actuator. The controller comprises a first command module including a first electronic configuration, wherein the first command module is configured to output a first control signal to control the actuator; a monitor module configured to monitor the first control signal output by the first command module; and a second command module including a second electronic configuration that is different than the first electronic configuration, wherein the actuator is controlled using the second control signal when the first command module is deactivated or malfunctioning.

While the above description primarily refers to controllers of propulsion systems, a backup command module may be included in any suitable electronic components and systems of an aircraft.

Figure 6:
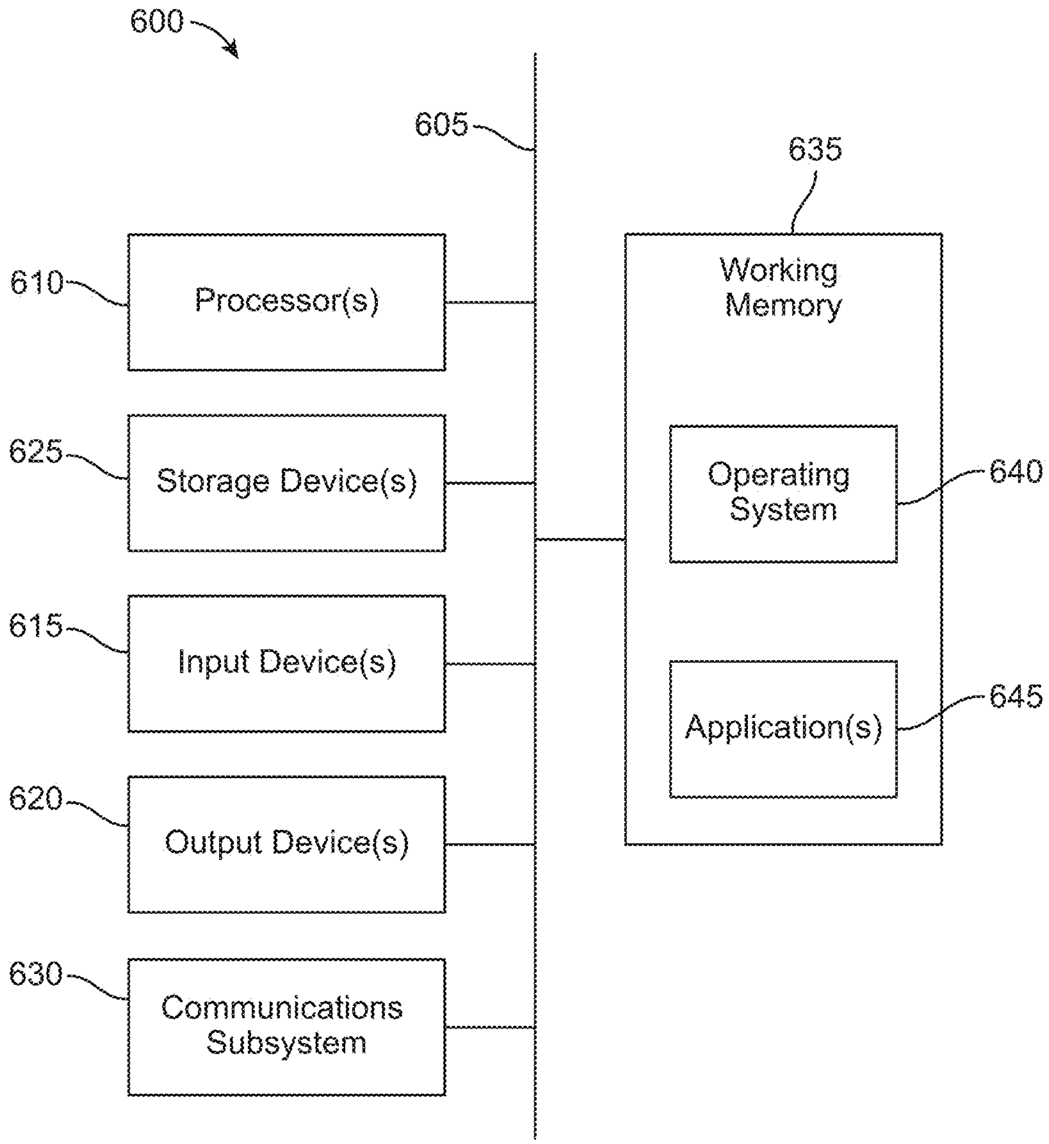
FIG. 6 illustrates aspects of a computer system, some of which may be incorporated as part of a vehicle management system computers, a controller, and/or other components of an aircraft, in accordance with embodiments of this disclosure.

FIG. 6 illustrates aspects of a computer system 600, some of which may be incorporated as part of one or more vehicle management system computers, a controller 200, and/or other components of an aircraft, in accordance with embodiments of this disclosure. FIG. 6 provides a schematic illustration of one embodiment of a computer system 600 that can perform various steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, video decoders, and/or the like); one or more input devices 615, which can include without limitation a mouse, a keyboard, remote control, any suitable operator interface, and/or the like; and one or more output devices 620, which can include without limitation a display device and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 600 may also include a communications subsystem 630, which can include without limitation a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code (e.g., to configure the computer system 600 to perform operations of methods to facilitate control of an aircraft disclosed herein), such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general-purpose computer (or other device) to perform one or more operations in accordance with the described methods.

A set of these instructions and/or code, including instructions and/or code to configure the computer system 600 to perform operations of methods to facilitate control of an aircraft disclosed herein, may be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general-purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

As mentioned above, in one aspect, some embodiments may employ a computer system (such as the computer system 600) to perform methods in accordance with various embodiments. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods to facilitate control of an aircraft described herein.

The terms "machine-readable medium," "computer-readable storage medium," "computer-readable medium," and plural forms thereof as used herein, refer to any medium or media that participate in providing data that causes a machine to operate in a specific fashion. These mediums may be non-transitory. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

For simplicity, various active and passive circuitry components are not shown in the figures. In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments may be combined in any suitable manner without departing from the spirit and scope of embodiments of the disclosure.

Electronic components of the described embodiments may be specially constructed for the required purposes or may include one or more general-purpose computers selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Additionally, spatially relative terms, such as "front" or "back" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "front" surface may then be oriented "back" from other elements or features. The device may be otherwise oriented (e.g., rotated 90 degrees or at other orientations) and the spatially relative descriptors used herein interpreted accordingly.

While embodiments have been described with reference to specific embodiments, those skilled in the art with access to this disclosure will appreciate that variations and modifications are possible.

It should be understood that all numerical values used herein are for purposes of illustration and may be varied. In some instances, ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure may be modified or omitted and that other elements not shown or described may be added.

The above description is illustrative and is not restrictive. Many variations will become apparent to those skilled in the art upon review of the disclosure. The scope of patent protection should, therefore, be determined not with reference to the above description, but instead should be determined with reference to the following claims along with their full scope or equivalents.

What is claimed:

1. A system to facilitate control of an aircraft, the system comprising:

a controller in communication with an actuator, the controller comprising:

a first command module comprising a first electronic configuration, wherein the first command module is configured to output a first control signal to control the actuator;

a second command module comprising a second electronic configuration that is has hardware and software dissimilar from the first electronic configuration, wherein the second command module is configured to output a second control signal to control the actuator; and a monitor module configured to monitor one or more of (i) one or more commands generated by the first command module, or (ii) one or more system response signals that are based at least in part on one or more sensors, wherein the monitor module comprises a third electronic configuration that has hardware and software dissimilar from the first electronic configuration and the second electronic configuration;

wherein the actuator is controlled using the second control signal when the first command module is deactivated or malfunctioning.

2. The system to facilitate control of an aircraft as recited in claim 1, further comprising:

a propulsion system that comprises the actuator, wherein the controller at least partially controls the propulsion system based at least in part on the first control signal or the second control signal.

3. The system to facilitate control of an aircraft as recited in claim 2, wherein the propulsion system further comprises a propeller, and the actuator is coupled to the propeller.

4. The system to facilitate control of an aircraft as recited in claim 1, wherein the aircraft is an autonomous aircraft.

5. The system to facilitate control of an aircraft as recited in claim 1, wherein the controller is configured to select the second command module for controlling the actuator in response to determining that the first command module is deactivated or malfunctioning.

6. The system to facilitate control of an aircraft as recited in claim 1, wherein:

the first command module receives a set of one or more input signals from a set of sensors corresponding to the one or more sensors, and generates the first control signal based at least in part on the set of one or more input signals;

the monitor module receives the set of one or more input signals from the set of sensors; and the monitor module generates a monitor signal based at least in part on the set of one or more input signals, compares the first control signal generated by the first command module to the monitor signal, and transmits the first control signal to the actuator if the first control signal matches the monitor signal.

7. The system to facilitate control of an aircraft as recited in claim 6, wherein the monitor module suppresses the first control signal when the first control signal differs from the monitor signal, wherein the second control signal is transmitted to the actuator when the first control signal is suppressed.

8. The system to facilitate control of an aircraft as recited in claim 6, wherein the second command module receives the set of one or more input signals from the set of sensors and generates the second control signal based at least in part on the set of one or more input signals.

9. The system to facilitate control of an aircraft as recited in claim 1, wherein the system is configured to generate an alert when the actuator is controlled using the second control signal when the first command module is deactivated or malfunctioning.

10. One or more non-transitory, machine-readable media having machine-readable instructions thereon which, when executed by one or more processing devices, cause a system to perform operations comprising:

controlling an actuator that is communication with the one or more processing devices based at least in part on:

outputting, with a first command module, a first control signal to control the actuator, wherein the first command module comprises a first electronic configuration;

outputting, with a second command module, a second control signal to control the actuator when the first command module is deactivated or malfunctioning, wherein the second command module comprises a second electronic configuration that has hardware and software dissimilar from the first electronic configuration; and monitoring, with a monitor module, at least one of (i) one or more commands generated by the first command module, or (ii) one or more system response signals that are based at least in part on one or more sensors, wherein the monitor module comprises a third electronic configuration that has hardware and software dissimilar from the first electronic configuration and the second electronic configuration;

wherein the actuator is controlled using the second control signal when the first command module is deactivated or malfunctioning.

11. The one or more non-transitory, machine-readable media as recited in claim 10, wherein:

the first command module receives a set of one or more input signals from a set of sensors, and generates the first control signal based at least in part on the set of one or more input signals;

the monitor module receives the set of one or more input signals from the set of sensors; and the monitor module generates a monitor signal based at least in part on the set of one or more input signals, compares the first control signal generated by the first command module to the monitor signal, and transmits the first control signal to the actuator if the first control signal matches the monitor signal.

12. The one or more non-transitory, machine-readable media as recited in claim 11, wherein the monitor module suppresses the first control signal when the first control signal differs from the monitor signal, wherein the second control signal is transmitted to the actuator when the first control signal is suppressed.

13. The one or more non-transitory, machine-readable media as recited in claim 11, wherein the second command module receives the set of one or more input signals from the set of sensors and generates the second control signal based at least in part on the set of one or more input signals.

14. The one or more non-transitory, machine-readable media as recited in claim 10, the operations further comprising generating an alert when the actuator is controlled using the second control signal when the first command module is deactivated or malfunctioning.

15. A method to facilitate control of an aircraft, the method comprising:

controlling an actuator that is communication with one or more processing devices based at least in part on:

outputting, with a first command module, a first control signal to control the actuator, wherein the first command module comprises a first electronic configuration;

outputting, with a second command module, a second control signal to control the actuator when the first command module is deactivated or malfunctioning, wherein the second command module comprises a second electronic configuration that has hardware and software dissimilar from the first electronic configuration; and monitoring, with a monitor module, at least one of (i) one or more commands generated by the first command module, or (ii) one or more system response signals that are based at least in part on one or more sensors, wherein the monitor module comprises a third electronic configuration that has hardware and software dissimilar from the first electronic configuration and the second electronic configuration; and wherein the actuator is controlled using the second control signal when the first command module is deactivated or malfunctioning.

16. The method to facilitate control of an aircraft as recited in claim 15, wherein the monitor module suppresses the first control signal when the first control signal differs from a monitor signal generated by the monitor module, wherein the second control signal is transmitted to the actuator when the first control signal is suppressed.

* * * * *